April 2, 1963  J. P. LANDIS  3,084,307
REGULATOR

Filed June 19, 1959  2 Sheets-Sheet 1

April 2, 1963    J. P. LANDIS    3,084,307
REGULATOR
Filed June 19, 1959    2 Sheets-Sheet 2
FIG. 3    FIG. 4
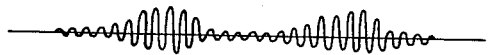    
FIG. 5
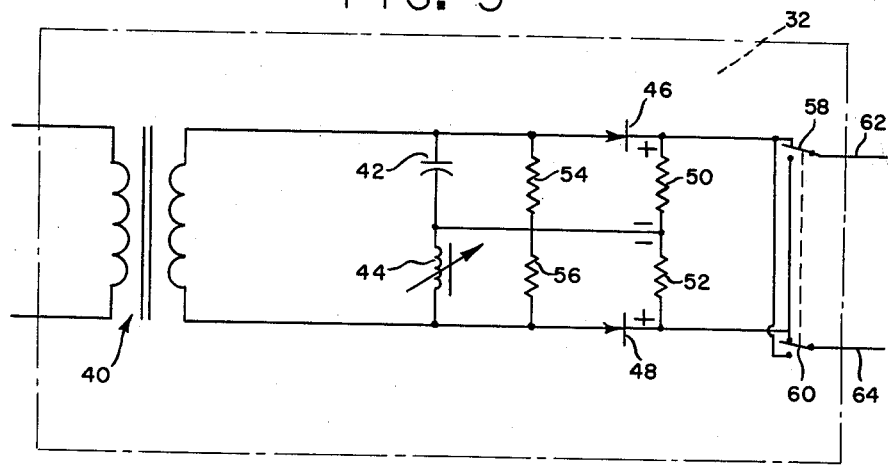

United States Patent Office 3,084,307
Patented Apr. 2, 1963

3,084,307
REGULATOR
James Philip Landis, Wilmington, Del., assignor to E. I. du Pont de Nemours and Company, Wilmington, Del., a corporation of Delaware
Filed June 19, 1959, Ser. No. 821,397
7 Claims. (Cl. 317—5)

This invention relates generally to electric motors and, more particularly, to a closed loop system for regulating precisely the speed of such motors.

Although such systems are well known, those in use today generally depend either on phase discrimination or the voltage difference between a signal which is proportional to actual shaft speed and a signal which is proportional to the set speed. Accordingly, any error is extremely small relative to the requency of the signals being compared and very sensitive circuitry is required if speed control within acceptable limits is to be accomplished. As a consequence, the circuit components often exhibit non-linear electrical characteristics, have a tendency to drift with ambient variations, and require frequent manual adjustment to maintain the set speed. To minimize the adjustments necessitated by ambient variations, expensive cooling equipment is often required. Additionally, the nature of known systems is such as to require an entirely separate and independent monitoring system to give a continuous indication or record either of the speed or the error.

The general objective of the present invention is to present a speed regulation system which obviates the difficulties encountered with the prior art systems, especially those difficulties which have been listed above.

The most important object of this invention is the provision of a system in which the control parameter is the low frequency difference between a fixed reference frequency and a generated frequency proportional to the speed of rotation of the regulated rotary device.

Another aim of the invention is to provide simplicity in the circuit components by means of which a minute speed variation is readily detected and a corresponding correction applied.

A further object of the invention is the provision of a speed regulation system operable over a wide spectrum of rotary speeds.

With these and other objectives in view, the closed loop speed regulation system of the present invention comprises generally a signal-generator tachometer coupled to a device to be regulated, a reference signal source, a mixing circuit for combining the signals from the tachometer and the reference source to produce a signal having a differential frequency, a tunable discriminator circuit onto which the differential signal is impressed, and speed correction means connecting the discriminator circuit to the device for applying corrections thereto. A method of regulating which involves the steps of generating a signal having a frequency proportional to the speed of the rotary device, mixing the generated signal with a reference signal to produce a differential frequency signal, impressing the differential frequency on a pre-tuned discriminator to produce an error signal, and applying the error signal to the rotary device in the form of a correction, is also presented.

Other objects will become apparent in the following specification wherein reference is made by the use of designating numerals to the accompanying drawings.

In the drawings:

FIGS. 3 and 4 illustrate wave forms of the differential signal generated in the system; and FIG. 5 is a wiring diagram of the discriminator circuit shown schematically in FIG. 2.

Figure 1:
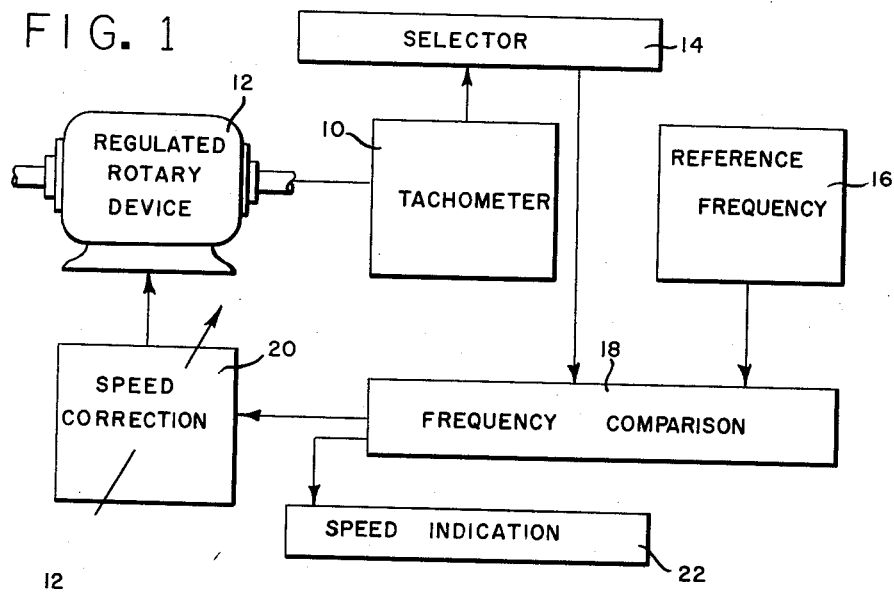
FIGURE 1 is a schematic representation of the speed regulation system of the present invention.

The speed regulation system of the invention, as shown in FIG. 1, includes a tachometer 10 coupled to a rotary device 12 and feeding an output signal to a selector 14 by means of which any one of a plurality of available tachometer outputs may be chosen. The frequency of the signal generated by the tachometer 10, which is proportional to the speed of rotation of the regulated device 12, is compared with that from a separate, precise, fixed frequency reference signal source 16 in a comparison component 18 to produce a differential or "beat" frequency. The output from component 18 is applied to speed correction means 20 wherein an error signal is generated whenever the abovementioned differential frequency varies from a reference differential frequency. A frequency meter 22 or the like may be connected to comparison component 18 as a means for achieving a process indication or record of the actual differential frequency.

Figure 2:
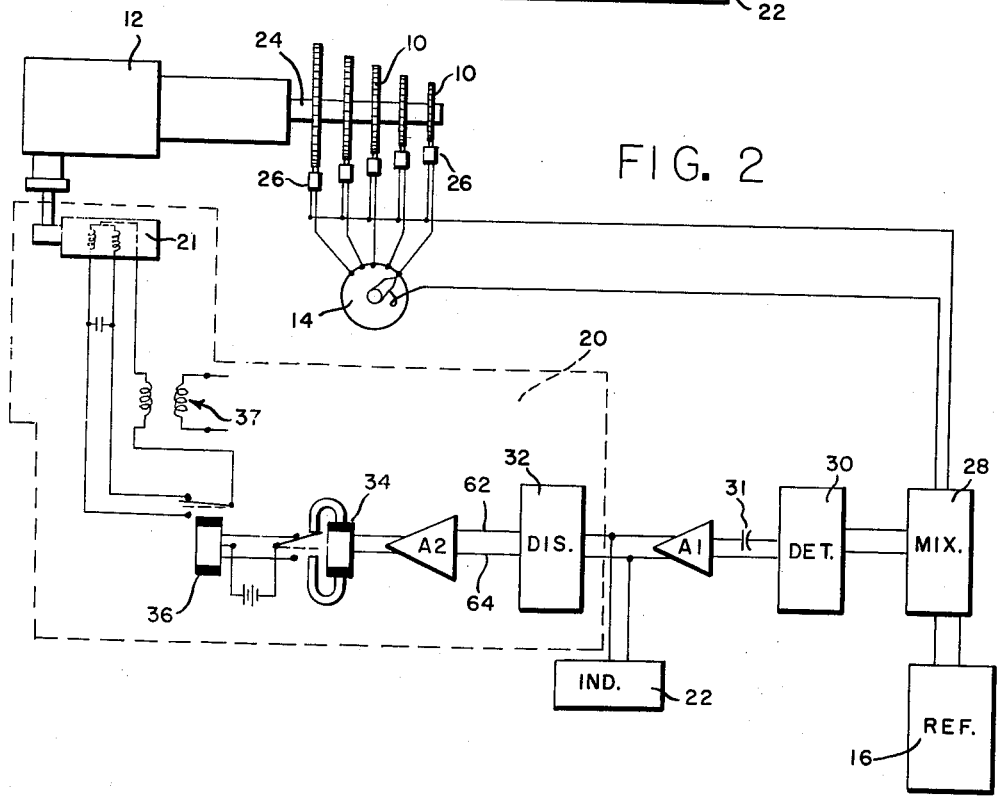
FIG. 2 is a more detailed schematic of the system shown in FIG. 1.

Referring now to FIG. 2, the device 12 is shown as a motor having a shaft 24 on which a plurality of toothed tachometer wheels 10 are fixedly attached, each having at its periphery a stationary magnetic pick-up head 26. Each of the individual wheels 10 corresponds to a different speed range of shaft 24 and generates a signal in its head 26 having a frequency which is a fixed multiple of the speed of shaft 24. Wheels 10, heads 26 and selector 14 thus comprise a variable pole or variable frequency tachometer. This tachometer has a selective plurality of outputs each of which is a multiple of the rotary input from the regulated device and each of which corresponds to a range of rotary speeds. According to which wheel 10 is selected on switch 14, a signal is transmitted to a mixing circuit 28 where it is combined with a signal from reference source 16 to produce a modulated signal which is the algebraic sum of the amplitudes of the two input signals. This signal is illustrated in FIG. 3 and has a frequency of amplitude modulation equal to the differential frequency and a carrier frequency which is an average of the inputs. The source or reference signal 16 has a frequency slightly above or below that generated by the selected wheel 10 when motor 12 is operating at set speed and the differential therebetween is equal to the differential or beat frequency mentioned above in connection with FIG. 1. The signal from mixing circuit 28 is sent to a detector 30 where it is demodulated and filtered to remove the carrier and passed through blocking capacitor 31 to remove the D.C. component and thereby produce the simple wave form shown in FIG. 4. When the speed of the shaft 24 varies from the set speed, the signal from detector 30 will vary correspondingly from the beat frequency. After amplification, the actual or generated differential frequency is impressed on discriminator 32. This signal may also be sent to a suitable indicator 22.

Any output from circuit 32 represents a deviation from a predetermined differential frequency and is transmitted through an amplifier A-2 to a single pole double throw polarized relay 34 having normally open switch contacts. The armature of relay 34 moves away from the neutral position in a direction dependent on the polarity of the signal from amplifier A-2. If the signal strength is sufficiently high, the corresponding switch contacts of relays 34 and 36 are closed, thereby energizing pilot motor 21 from A.C. source 37. Motor 21 functions to vary the position of adjustable brushes (not shown) in motor 12.

The demodulated signal from detector 30 and capacitor 31 is transmitted to discriminator circuit 32 via the amplifier A-1 in FIG. 2. The circuit 32, as shown in FIG. 5, is in resonance when the voltage drops across capacitor 42 and across manually tunable inductance 44 are equal. Diodes 46 and 48 rectify the voltages across capacitor 42 and inductance 44 respectively, with the polarities as shown in the figure. Resistors 54 and 56 are provided for loading purposes. As long as the signal from coupling transformer 40 has a frequency equal to the resonance frequency of discriminator 32, i.e., as long as the beat frequency equals the desired predetermined differential frequency, the voltages across resistors 50 and 52 will be equal and there is no output or error signal. However, if the actual differential frequency (FIG. 4) varies from the predetermined tuned frequency, then the voltage drop across capacitor 42 will not equal the voltage drop across inductance 44 and a voltage will be impressed on amplifier A-2 thus producing current flow in the conductors which are connected to the polarized relay 34.

In operation, the motor speed corresponding to one of the tachometer wheels 10 is set by positioning selector 14 and the signal generated by the passage of the teeth on the selected wheel 10 in close proximity to its associated pick-up head 26 is transmitted to mixing circuit 28. As an example, for a set rotary speed, let it be assumed that the tachometer generated signal is at a frequency of 5,200 cycles per second and that the signal from reference 16 is at a frequency of 5,000 cycles. Accordingly, the signal discharging from the detector is at a frequency of 200 cycles plus or minus any error. This low frequency signal is impressed on discriminator 32 which in this example will have been tuned for 200 cycles by adjustment of inductance 44. As long as any error exists, the relay 34 is actuated and a correction is applied. If motor 12 is operating precisely at the set speed, relay 34 remains on neutral and pilot motor 21 is not energized. As long as relay 34 is on neutral, motor 12 can drift back and forth within a "dead" band, the width of which is determined by the level of the signal voltages, the gains of amplifiers A-1 and A-2 and the sensitivity of relay 34 and has been found typically to be less than ±0.04% of set speed.

Speed adjustments may be accomplished by tuning discriminator 32 by means of the inductance 44 which typically has a range of from 50 to 500 cycles. Thus, in the above example, if an adjusted speed corresponding to a tachometer output at 5,100 cycles is desired, representing a decrease of 100 cycles from the preceding example, discriminator 32 may be tuned from 200 to 100 cycles to give an over speed error signal until such time as the shaft speed has been reduced to a point where the tachometer signal is at the desired 5,100 cycles. It is apparent that the set speed may similarly be raised by raising the tuned frequency of circuit 32. These adjustments may be carried through the range of inductance 44 twice for each wheel by providing reversing switches 58, 60 in the conductors 62, 64 leading from circuit 32 to relay 34. This feature permits operation at any speed within the range of any wheel 10; in fact, the tuning range of the discriminator permits overlapping of the tachometer outputs. By selecting a suitable wheel 10, by tuning discriminator 32, and by properly positioning reversing switches 58, 60, infinite variation of controlled speed over a wide range, without gaps, may be achieved.

Additionally, a method is presented which involves the use of a low frequency signal as the control parameter in regulating a device which generates relatively high frequency, speed proportional signals. According to the method, a signal is generated which has a frequency proportional to the actual speed of the regulated device and combined with a reference signal having a frequency near that of the generated signal. The resulting low frequency signal which includes in full magnitude any error in the generated signal, is impressed on a discriminator tuned to a predetermined difference between the generated and reference signals when the device is operating at set speed. The percentage error in this low frequency signal is relatively large in comparison with the corresponding error in the generated frequency which facilitates precise measurements and corrections.

It is apparent that many changes and modifications may be made in the disclosed speed regulation system without departing from the spirit of the present invention which is therefore intended to be limited only by the scope of the appended claims.

I claim:

1. In a system for regulating the speed of a rotary device: a signal-generating tachometer coupled to the device for rotation therewith; a fixed frequency reference signal source; a mixing circuit for combining the signals from the tachometer and said source to produce a signal having a frequency equal to the actual difference between the frequencies of the tachometer and source signals; a tunable resonant circuit receiving the output of said mixing circuit and having an output only when said actual difference varies from the resonance frequency; and speed correction means interconnecting the resonant circuit to said device for applying the output of said resonant circuit to said device.

2. In a system for regulating the speed of a rotary device: a signal-generating tachometer having a selective plurality of outputs, each corresponding to a different rotary speed range and each being a different multiple of the input from the rotary device, said tachometer being coupled to the device for rotation therewith; a fixed frequency reference signal source; a mixing circuit for combining the signals from said tachometer and said source to produce a signal having a frequency equal to the actual difference between the selected tachometer and source signals; a resonant discriminator circuit coupled to the mixing circuit, said discriminator circuit including components tunable to a frequency equal to a preselected difference between the frequencies of the tachometer and source signals; and speed correction means interconnecting the discriminator circuit and said device, said discriminator circuit having an output only when the actual difference varies from the resonant frequency.

3. The system of claim 2 wherein said components are a capacitor and a variable inductance tunable to said preselected difference frequency for speed regulation purposes and away from said preselected difference frequency for speed variation purposes.

4. The system of claim 3 wherein conductors connect the discriminator circuit to said speed correction means and wherein a switch is provided for reversing these conductors to permit additive speed adjustments through the range of said variable inductance.

5. The system of claim 2 wherein speed indicating means is connected to the mixing circuit in parallel with said discriminator circuit.

6. In a system for regulating the speed of a rotary device: a plurality of tachometer wheels, each coupled to said rotary device for rotation therewith and each corresponding to a different rotary speed range; a magnetic pick-up head for each wheel; a circuit coupled to the device for applying a speed correction thereto, said circuit including components for comparing a tachometer signal to a fixed frequency reference signal and for discriminating any variation in the frequency differential therebetween from a predetermined low frequency, said discriminating component including a tunable inductance; and means selectively coupling the heads to said circuit.

7. In a system for regulating the speed of a rotary device: a variable frequency tachometer coupled to the device for rotation therewith; a fixed frequency reference signal source; a mixing circuit for combining the tachometer and reference signals to produce an actual differential frequency signal; a resonant circuit coupled to said mixing circuit, said resonant circuit being tunable in the range of said differential frequency whereby to produce an output signal dependent on the variation of said actual differential frequency from a selected differential frequency; and speed correction means coupling the resonant circuit to said device.

References Cited in the file of this patent

UNITED STATES PATENTS

| | | |
|---|---|---|
| 2,017,894 | Cady | Oct. 22, 1935 |
| 2,551,306 | Wisman | May 1, 1951 |
| 2,705,303 | Stinger | Mar. 29, 1955 |
| 2,775,724 | Clark | Dec. 25, 1956 |
| 2,899,639 | Shepherd | Aug. 11, 1959 |